United States Patent Office 2,960,224
Patented Nov. 15, 1960

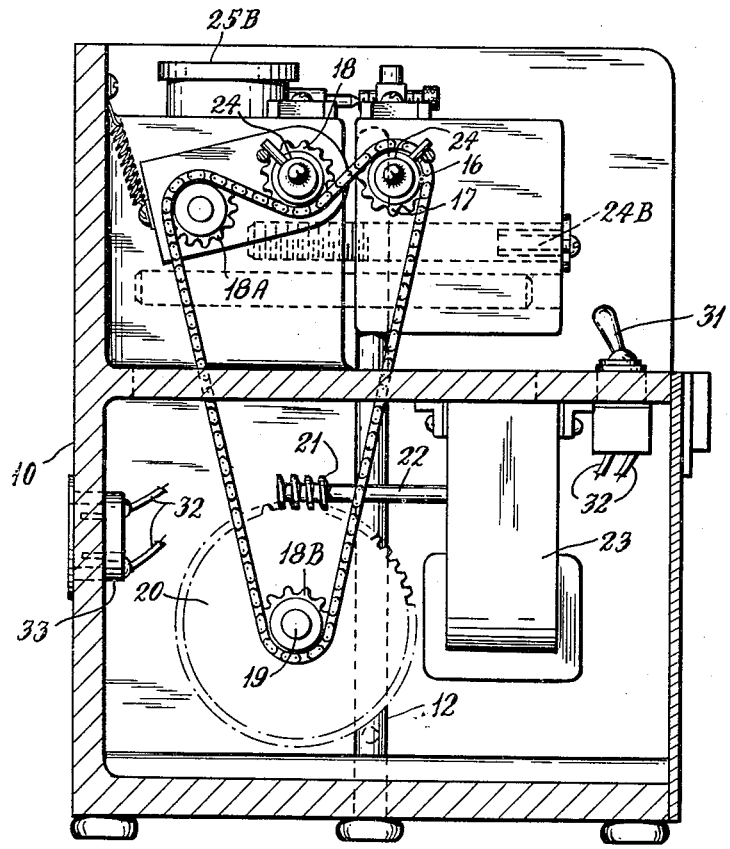
Fig. 3
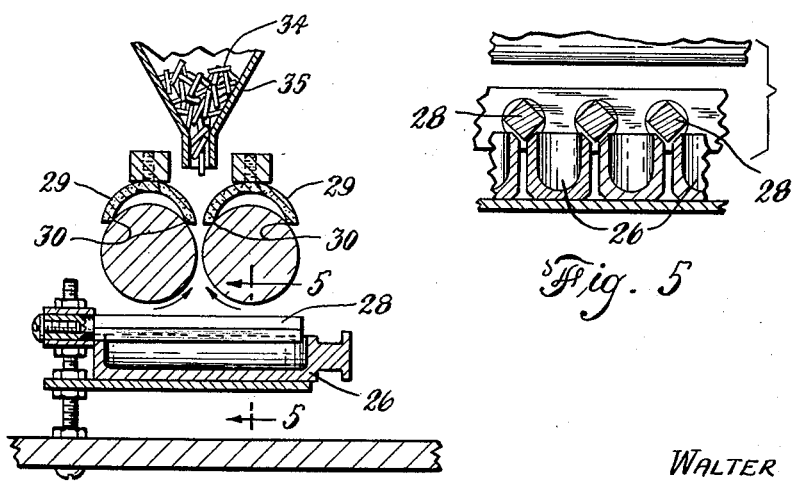
Fig. 4
Fig. 5
INVENTOR.
WALTER I. CRONAN

2,960,224

GRADING MACHINE

Walter I. Cronan, 175 Ames Ave., Leonia, N.J.

Filed June 20, 1956, Ser. No. 592,614

1 Claim. (Cl. 209—107)

This invention relates to a grading machine and is more particularly concerned with a machine for grading blanks of material such as germanium crystal dice, metallic parts, quartz blanks, and the like.

In the manufacture of electronic devices and machinery, there are many small parts which must be exact in size, especially with respect to thickness and uniformity in width and thickness. The problem of measuring these small parts, as in the case of germanium crystal dice for use in transistors is a difficult one, and in the past, such measurement had been done manually by measuring the thickness of each blank separately by the standard micrometers or micrometer devices. Such manual measurement is time consuming, and if accurate grading is to be achieved, large production is difficult, and may require a large number of skilled workers. In addition, the grading by manual measurement does not achieve an accurate test of uniformity of thickness of the blanks and the existence of the possibility of error in manual grading cannot be excluded as an important factor. The problem of breakage of the blanks is a common one where the grading is done manually.

One of the objects of this invention is to provide a means for measuring the thickness of small parts and to determine the uniformity of the thickness of the individual blanks at the same time. By means of this invention, a grading machine is provided whereby the parts to be measured are measured automatically and graded separately, and the blanks or parts not found to be satisfactory are rejected. The machine handles automatically the measurement, the sorting and rejection of faulty blanks. In addition, the machine can be adjusted easily so that the degree of measurement may be changed or adjusted to the desired condition. It is not necessary that the operator of the machine be a highly skilled technician, and with mechanical feeding, no operator at all is necessary.

For a better understanding of the invention, reference is made to the drawings in which:

Figure 3 is a sectional view of the machine on the line 3—3 of Figure 2;

Figure 4 is a detail partly in section on the lines 4—4 of Figure 2 of the rollers and the collecting boxes; and Figure 5 is a detail partly in section on the lines 5—5 of Figure 4.

Figure 1:
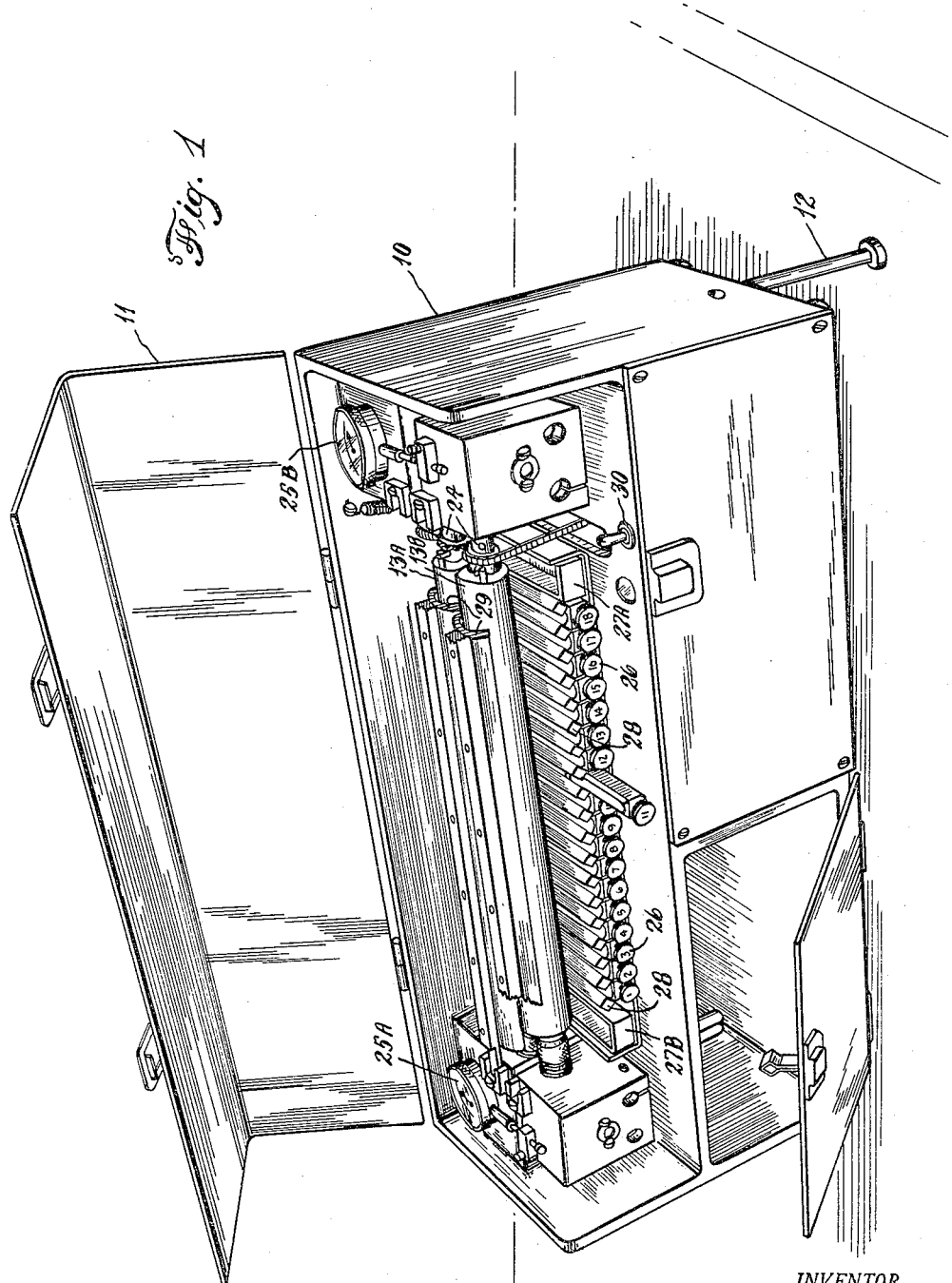
Figure 1 is a perspective view of the grading machine.
Figure 2:
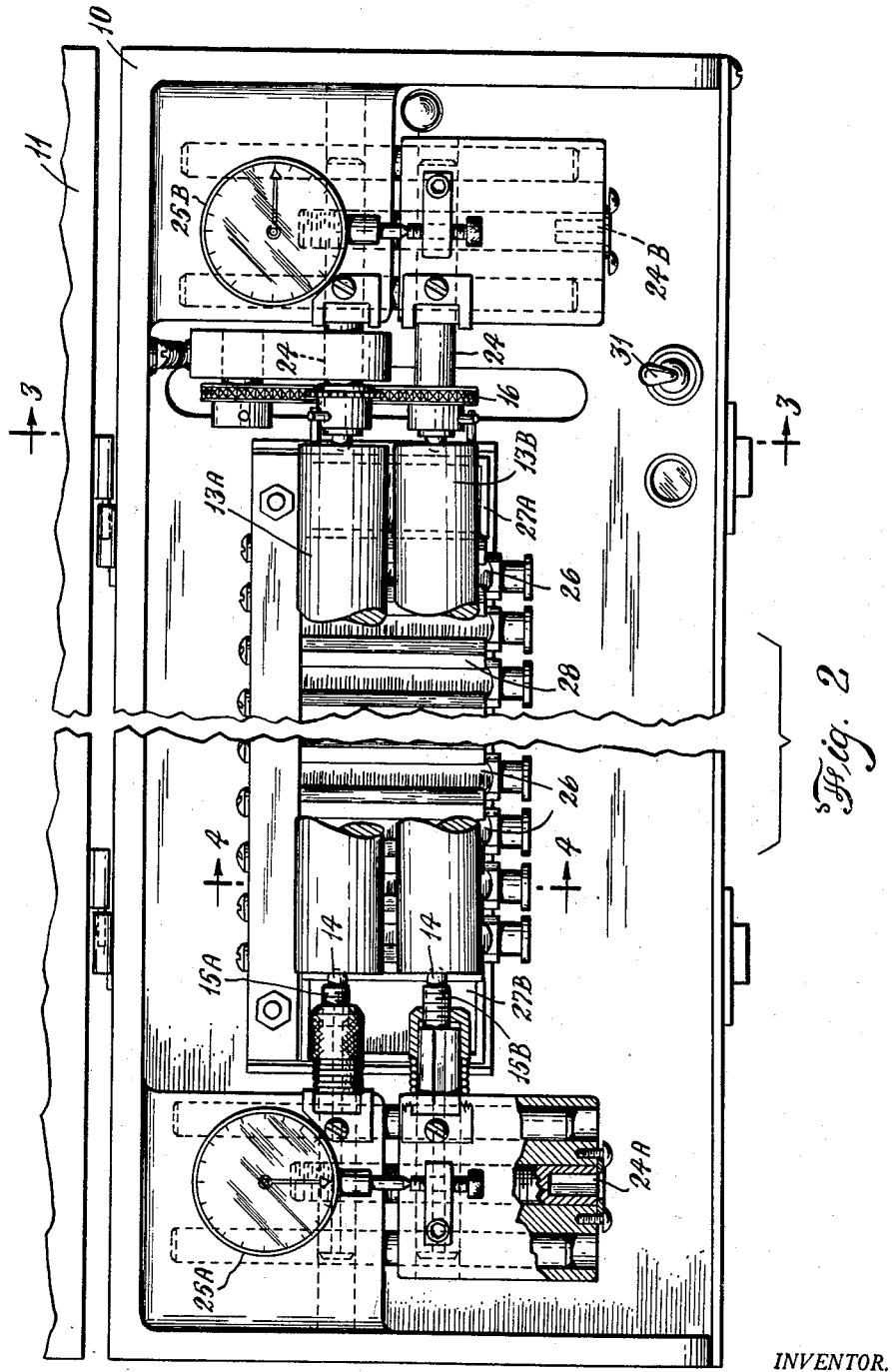
Figure 2 is a plan view of the machine.

Referring to the drawings, 10 represents the case for the grading machine, which in the form shown, is a self-contained unit, having a removable lid 11, hinged or otherwise connected to the case. The carrying case 10 also serves as the support and housing for the machine itself, and, as a consequence, it is preferably a solid casting and sufficient gauge material to provide stability. A vertical leg 12 slidably engaged in the bottom of the case and near the feeding end of the mechanism serves to tilt the machine and cause a down-hill pitch to the machine. The leg 12 is adjustable in length to achieve varying degrees of tilt, and when in closed position, collapses in a recess in the bottom of the case.

A pair of horizontal rollers 13A and 13B are provided, and in the form shown, each roller has cupped ends and are supported on balls 14 in bearing studs 15A and 15B. The bearing stud 15A is fixed whereas the bearing stud 15B is springloaded for easy assembly or detachment of the roller. In the form shown in the drawings, the rear roller 13A is maintained in a fixed position, whereas the front roller 13B is movable at each end to allow angular adjustment of the space between the two rollers. In some cases, it may be advantageous to provide means whereby both of the rollers are movable horizontally to allow for angular adjustment of the space. A chain drive 16 running over a sprocket 17 on roller 13B, under a sprocket 18 on roller 13A and over a tension sprocket 18A, cause the rollers to rotate in opposite directions, and in such a manner that the adjacent surfaces on the rollers move upwardly. The chain drive then runs down from the tension sprocket 18A to a sprocket 18B mounted on a shaft 19. A gear 20 also mounted on the shaft 19 meshes with a worm gear 21 which is mounted on the shaft 22 driven by an electric motor 23, which motor is mounted in the case, preferably beneath the rollers. The motor drives the shaft 22 which revolves the gear 20 on shaft 19 and drives the sprocket 18B to move the chain drive for rotating the rollers. This driving mechanism may be varied or changed without changing the invention. The sprocket and chain driven mechanism as shown are independent of the rollers and thus provide smoother motion.

In the form as shown, adjustable eccentric studs 24 located at the sprocket ends of the rollers, are provided for accurate vertical plane adjustment of the rollers 13A and 13B. The adjustment of the rollers in the horizontal plane is made by actuation of the keys 24A and 24B at each end of the roller. The relative positions of the rollers at each end, in the horizontal plane are shown by the dials 25A and 25B which are mounted on the housing, and are correlated with movements of the keys 24A and 24B. Quick and accurate adjustment of the position of roller 13B may be accomplished by actuation of the keys 24A and 24B, by a conventional wrench, and this construction provides a means for extremely accurate adjustment of the relative positions of the rollers. It should be understood that the means for the horizontal adjustment of the rollers may be of any conventional type without in any way changing the novelty of my machine.

Beneath the rollers, a series of blank receiving or collecting bins 26 are arranged perpendicular to the rollers, so that when the blanks which are moving in the valley between the rollers 13A and 13B fall between the rollers, they are caught in the collecting bins. In the device as shown, there are eighteen bins arranged parallel and next to each other in a row all perpendicular to and below the rollers. The bins serve to collect the measured blanks as they fall between the rollers. Below each end of the rollers, two large collecting bins 27A and 27B may be provided to serve as reject bins to collect those undersized blanks too small to be measured at the feeder end having the narrow space, or oversized blanks too large to be measured at the end of the wider space, which have ridden the entire length of the valley between the two rollers. Dividers 28, are preferably provided above the bins, to provide sharp edge division of the blanks in the desired categories, and also to channel the blanks into the specified collecting bins rather than to allow the blank to fall into or between the bins. The use of the dividers also prevents the blanks from falling into the bins and breaking upon impact.

A pair of graphite shields 29 are provided to fit over the rollers, and these shields serve to trap and knock down small blanks which are attempting to ride out of the rollers. These shields also provide anti-static protection for the rollers and the machine, and serve to funnel in the blanks dropped on the rollers from the feeding mechanism for measurement. The blanks being fed to the machine will strike the shields 29 and are forced to fall between the moving rollers, instead of falling directly on the moving surfaces of the rollers. Preferably these shields contact the rollers only at the edges 30.

An electrical switch 31, which is of the conventional type to be actuated in on or off positions is mounted on the case and is used to turn the motor on or off, to actuate the rollers. Electrical current is supplied by the conventional power sources and a wire connection 32 with a standard plug 33 is provided for this purpose.

In the operation of the mechanism, the machine is raised at a tilt to the desired position by adjustment of the leg in the bottom of the case. The roller 13B is then adjusted at each end to the desired position in relation to the roller 13A which is fixed, so that the various widths to provide the desired tolerances, in accordance with the type of pieces to be measured. The machine is then started by turning on the motor and it is ready for operation. The pieces to be measured are allowed to fall upon the rollers at the higher end thereof so that such pieces will slide along the valley of the rollers until they reach the tolerance point between the rollers to allow the piece to drop between the rollers and fall into the bins 26 below. The tolerance between the rollers should be fixed so the narrowest tolerance desired is at the higher end of the rollers, in order that the pieces to be measured will be carried along from the ends of the rollers between which are the narrowest tolerances to the end having the widest tolerances.

During the travel of the pieces to be measured, the operator will be able to ascertain not only the thickness of the pieces to be measured, but also whether the pieces being measured are uniform in thickness. If the pieces are not uniform in thickness, they will tend to hang between the rollers, where the narrower edge of the piece has fallen between rollers and the wider part is held between the rollers.

In order to measure the thickness and to grade the blanks automatically according to the machine of this invention, the blanks 34 are placed in a hopper 35 or any of the standard devices such as a conveyor belt may be employed and the blanks are then guided to the rollers one by one. Due to the rotation of the rollers 13A and 13B and the incline of the position of the machine, the blanks 34 will move from the feeding end of the rollers toward the other end along between the two rollers. The thinner blanks will fall through the space between the rollers nearest the feeding end of the rollers at precisely the point corresponding to their thickness, whereas the thicker blanks which cannot fall through at the narrower spacing between the rollers will move downwards toward the lower end until the spacing between the rollers is reached to allow the blank to fall through to the bins 26. In this manner blanks of certain predetermined thickness will fall through into the bins, always at the same point, and each bin will always receive the blanks of the same predetermined thickness or thickness range.

In addition to the grading of the blanks as accomplished by this machine, an added advantage is obtained since brittle, soft, frangible or fragile blanks are measured and remain undamaged in the grading. In ordinary grading by manual processing, the damage to some types of blanks is heavy and as a consequence very costly. Very small parts, such as germanium crystals, which are too small for manual measurement may be readily handled in bulk without damage or contamination. This machine will grade and measure any types of small parts, whether blanks, pieces, balls and of whatever shape, and may be found especially useful in measuring the diameter of small balls, such as ball bearings, etc.

While, with the above specification, I have disclosed the principles of my invention with the embodiments shown above, it will be understood that these embodiments are given for the purpose of examples only, and not as limiting the scope of my invention.

Having described my invention, I claim:

A machine for grading small parts comprising a frame, a pair of horizontal rollers rotatably mounted in the frame, means for separately rotating the rollers, means for adjusting the horizontal plane of the rollers, separate means for adjusting the angular positions of the rollers, graphite shields bearing against said rollers for preventing the parts from riding up the sides of said rollers and for diminishing static on the rollers, and a plurality of parts receiving receptacles below the space between the rollers, for receiving the parts falling between said rollers.

References Cited in the file of this patent

UNITED STATES PATENTS

| | | |
|---|---|---|
| 359,514 | Mueller | Mar. 15, 1887 |
| 1,090,817 | Knoerzer | Mar. 17, 1914 |
| 2,343,042 | Barry | Feb. 29, 1944 |
| 2,378,896 | Bryan | June 26, 1945 |
| 2,761,560 | Pomernacki | Sept. 4, 1956 |
| 2,786,574 | Clark | Mar. 26, 1957 |

FOREIGN PATENTS

| | | |
|---|---|---|
| 920,219 | France | Jan. 2, 1947 |